(12) United States Patent
Pearce et al.

(10) Patent No.: US 8,200,661 B1
(45) Date of Patent: Jun. 12, 2012

(54) DYNAMIC RECOMMENDATIONS BASED ON USER ACTIONS

(75) Inventors: Cail Pearce, San Francisco, CA (US);
Peter Dolan, San Francisco, CA (US);
Owen Carlsen, San Francisco, CA (US);
Kirill Buryak, Sunnyvale, CA (US);
Rob Christy, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 392 days.

(21) Appl. No.: 12/338,847

(22) Filed: Dec. 18, 2008

(51) Int. Cl.
*G06F 7/00* (2006.01)
*G06F 17/30* (2006.01)

(52) U.S. Cl. ....................................................... 707/721
(58) Field of Classification Search .................. 707/721, 707/999.005
See application file for complete search history.

(56) References Cited

U.S. PATENT DOCUMENTS

| | | | |
|---|---|---|---|
| 6,236,978 | B1 | 5/2001 | Tuzhilin |
| 7,594,189 | B1 * | 9/2009 | Walker et al. .................. 715/811 |
| 2002/0052880 | A1 | 5/2002 | Fruensgaard et al. |
| 2004/0083205 | A1 * | 4/2004 | Yeager .............................. 707/3 |
| 2004/0098391 | A1 | 5/2004 | Robertson et al. |
| 2005/0234973 | A1 * | 10/2005 | Zeng et al. ................. 707/103 R |
| 2005/0267817 | A1 | 12/2005 | Barton et al. |
| 2006/0085263 | A1 | 4/2006 | Greer et al. |
| 2008/0209350 | A1 | 8/2008 | Sobotka et al. |
| 2008/0222535 | A1 | 9/2008 | Zrike et al. |

OTHER PUBLICATIONS

Non-Final Office Action in U.S. Appl. No. 12/338,923, mailed Jun. 23, 2011, 18 pages.
Co-pending, commonly assigned U.S. Appl. No. 12/338,923, filed Dec. 18, 2008, 35 pages.

* cited by examiner

*Primary Examiner* — Aleksandr Kerzhner
(74) *Attorney, Agent, or Firm* — Sterne, Kessler, Goldstein & Fox P.L.L.C.

(57) ABSTRACT

Embodiments of a system (such as a computer system), a method, and a computer-program product (e.g., software) for use with the computer system are described. These embodiments may be used to provide one or more recommendations to a user based at least in part on monitored user actions while the user interacts with a support document (e.g., a website or a web page) that includes content for multiple support topics, such as help instructions associated with an application or a service. In particular, one or more support topics are associated with the monitored user actions using a supervised-learning model, and these support topics are recommended to the user. This supervised-learning model may be trained on portions of the content accessed by multiple users during multiple sessions. Moreover, in the supervised-learning model, content accessed by one of the users during a given session may be more relevant than content accessed by this user during the multiple sessions.

22 Claims, 6 Drawing Sheets

DYNAMIC RECOMMENDATIONS BASED ON USER ACTIONS

CROSS REFERENCE TO RELATED APPLICATIONS

This application is also related to co-pending U.S. patent application Ser. No. 12/338,923, filed on 18 Dec. 2008, entitled "Dynamic Recommendations Based on Activity History," the contents of which are herein incorporated by reference.

BACKGROUND

1. Field

The present embodiments relate to techniques for dynamically providing recommendations, and in particular, information about one or more support topics that are relevant to a user.

2. Related Art

Online services presently enable millions of users to perform various actions, such as: communicating via email, exchanging information on blogs or social networks, or configuring a product (e.g., managing an advertising account). While using one of these online services, users eventually have questions about the service or they encounter problems that they want to fix.

Service providers typically offer users assistance with their questions or problems using a tiered support system. Initially, users are directed to an online-support web page or website, which includes information about a large number of support topics. For example, a help website may include a number of articles (which is sometimes referred to as a 'corpus') that are arranged in a topic hierarchy. Users can sort through these articles to find answers to their questions or to find solutions to their problems by browsing through the topic hierarchy and/or by providing search queries to a search engine.

If a user is unable to find the answer or the solution the user needs, the user can access a second tier in the support system by calling an operator at a help center or by sending an email to the help center. In these cases, the operator researches the user's questions or problems and, via telephone or email, provides the user with the information the user needs. However, this second tier of support is significantly more expensive than online-support web pages or websites, and does not scale well as the number of users of an online service increases. Because of these operating expenses, service providers prefer users to find answers and solutions themselves using the online-support web pages or websites.

Unfortunately, the number of articles in many online-support web pages or websites is often so large that it can be very difficult for users to find the appropriate articles. This is because the corresponding topic hierarchy is both wide and deep, with the articles arranged in numerous, narrow segments. Navigating through such a topic hierarchy is difficult, even for the individuals who are responsible for maintaining the corpus.

Furthermore, even though there are often a large number of articles, the corresponding vocabulary in these articles is often limited. This presents a challenge to search engines because of the so-called synonym issue. In particular, during a search of documents on the Internet, it is likely that there is a web page or website that includes the same words as those in a user's search query. This is typically not the case when performing a search of the articles on an online-support web page or website unless the exact terminology in these articles is used in the search query.

A variety of existing techniques attempt to address the challenges associated with navigating through online-support web pages and websites. These include improved topic hierarchies (e.g., using navigation analysis to determine multi-topic hierarchies and the associated tagging), which attempt to address the mismatches between the mental models of the article configuration held by the users and the individuals who maintain the corpus. Additionally, the performance of search engines can be improved by expanding user search queries to include additional keywords (such as synonyms) or by having users answer a series of diagnostic questions. However, these existing techniques still require users to expend considerable effort to find appropriate articles in collections of articles that are increasing in size and in topic hierarchies that are becoming more complicated. This effort increases user frustration, decreases their satisfaction, and makes it more likely that they will access the second tier in the support system, which increases the operating expenses for the service providers.

SUMMARY

One embodiment provides a system that provides a recommendation. During a current session, the system monitors user actions while a user interacts with a support document (such as a website or a web page) that includes content for multiple support topics. For example, the content may include help instructions associated with an application or a service. Next, the system provides the monitored user actions to a supervised-learning model. This supervised-learning model is trained on portions of the content accessed by multiple users during multiple sessions. Moreover, in the supervised-learning model, a first portion of the content accessed by a given user during a given session has a larger weight when identifying the one or more support topics than a second portion of the content accessed by the given user during the multiple sessions. Then, the system accesses output of the supervised-learning model that corresponds to one or more identified support topics in the multiple support topics, and the system provides the recommendation, which include the one or more identified support topics, to the user.

Note that the recommendation may be provided dynamically during the current session, for example, as the user actions change or evolve. The recommendation may include a ranking of the one or more support topics based at least in part on estimated relevance of the one or more support topics to the user (for example, a likelihood that the one or more support topics are associated with the user's problem or question).

Moreover, the supervised-learning model may be adapted during the current session of the user. Alternatively, the supervised-learning model may be predetermined, in which case the multiple sessions of the multiple users precede the current session.

For the given user, the weight in the supervised-learning model of the first portion of the content accessed during the given session may correspond inversely to a number of support topics in the first portion of the content. For example, the weight associated with the first portion of the content may decrease as the number of support topics increases, because the relevance of these support topics is less likely to be relevant to the user's problem or question.

Additionally, the user actions may include support topics that are accessed in a time interval during the current session and/or one or more previous sessions. The weight for a given accessed support topic when identifying the one or more support topics may correspond inversely to an elapsed time since the given support topic was accessed. For example, an associated weight in the supervised-learning model may decrease as the elapsed time increases.

There may be at least partial overlap of the first portion of the content accessed by the given user in the given session and the second portion of the content accessed by the given user. Alternatively, the first portion of the content may be different than the second portion of the content.

This system may also provide the recommendation for the one or more support topics without the user providing login information (i.e., without explicit user identification) and/or without the user providing a support query (i.e., without an explicit question or topic provided by the user).

In some embodiments, the one or more support topics are identified based at least in part on a user configuration of a product (such as an online advertising account) and/or user preferences.

Another embodiment provides a method including at least some of the above-described operations that are performed by the system.

Another embodiment provides a computer-program product for use in conjunction with a computer system. This computer-program product may include instructions corresponding to at least some of the above-described operations that are performed by the system.

Another embodiment provides the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a system (such as a computer system), a method, and a computer-program product (e.g., software) for use with the computer system are described. These embodiments may be used to provide one or more recommendations to a user based at least in part on monitored user actions while the user interacts with a support document (e.g., a website or a web page) that includes content for multiple support topics, such as help instructions associated with an application or a service. In particular, one or more support topics are associated with the monitored user actions using a supervised-learning model, and these support topics are recommended to the user. This supervised-learning model may be trained on portions of the content accessed by multiple users during multiple sessions. Moreover, in the supervised-learning model, content accessed by one of the users during a given session may be more relevant than content accessed by this user during the multiple sessions.

By monitoring user actions and providing the one or more recommendations, this recommendation technique allows the user to access appropriate support topics, and thus, to find answers and solutions to problems and questions in the support document. Moreover, the recommendation technique can identify the one or more support topics without the user providing login information (i.e., without explicit user identification) and/or without the user providing a support query (i.e., without an explicit question or topic provided by the user). Therefore, the recommendation technique can reduce the time and effort associated with navigating or searching through the support document, which reduces user frustration, increases their satisfaction, and makes it less likely that users will require expensive operator support at a help center.

We now describe embodiments of a process for providing a recommendation. Many users have online accounts associated with a product or a service. These online accounts may be associated with a variety of services or types of information provided by a host or a service provider (henceforth referred to as an 'online service' and a 'service provider,' respectively). For example, the online account may be associated with: an email account of the user, a user blog, a user website, a search engine (such as a search history for the user), health records of the user, an advertising account of the user, and/or a merchandise account of the user (which the user may use to sell or purchase items).

Figure 1:
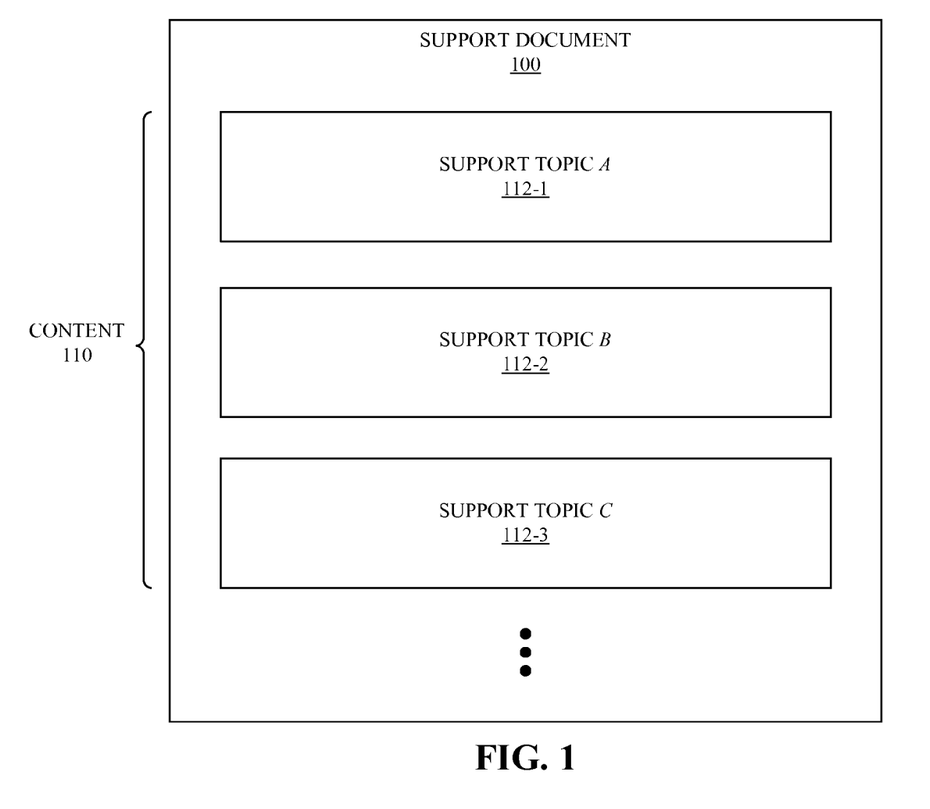
FIG. 1 is a block diagram illustrating an embodiment of a support document.

While using online services, users eventually have questions about the online service or encounter problems that they want to fix (which is henceforth referred to as a 'user problem'). As shown in FIG. 1, when a user problem occurs, a user is typically encouraged to access a support document 100 (such as a website or a web page) that includes content 110 for multiple support topics 112 (or associated links to content 110 on the same or another web page). For example, content 110 may include help instructions associated with an online service.

As noted previously, it is often difficult for the user to find one or more appropriate support topics (in the multiple support topics 112) that are relevant to the user's problem. As described further below with reference to FIGS. 3 and 4, a computer system may use one or more processes (such as processes 200 in FIG. 2A and/or 250 in FIG. 2B) to address this challenge by providing one or more recommendations to the user, which help the user navigate through support document 100 by providing one or more support topics that are likely to be relevant to the user's problem and likely to help the user.

In particular, this computer system may be used to provide personalized dynamic online help to users in the form of the one or more recommendations. These recommendations for the one or more support topics may be provided to the user without the user first providing login information (i.e., without explicit user identification, such as a user name and a password) and/or without the user first providing a support query (i.e., without an explicit question or topic provided by the user).

In some embodiments, the one or more support topics may be identified based at least in part on monitored user actions while the user interacts with support document 100 during a current session. For example, the support documents or links on support document 100 that are accessed or activated by the user may be monitored. Then, using a first supervised-learning model (which is henceforth referred to as a 'support-topic-correlation model'), which is trained using the content accessed by multiple users during multiple sessions, the one or more support documents may be identified. Note that in this supervised-learning model, first support topics accessed by a given user during a given session are more likely to be related to a common problem than second support topics that are accessed by the given user during the multiple sessions. Consequently, the first support topics may have larger weights than the second support topics. However, as the number of support topics accessed by the given user during the given session increases, the relationship to the common problem may decrease. Therefore, the weights in the support-topic model may depend inversely on the number of support topics accessed during the given session.

Alternatively or additionally, the one or more support documents may be identified based at least in part on a stored user configuration of an online service (such as static setup information for an online advertising account) and/or a stored dynamic user-account history for this online service (such as financial information associated with the online advertising), which are retrieved when the user accesses support document 100. Then, using a second supervised-learning model (which is henceforth referred to as a 'configuration/history model'), which is trained using the user configurations and/or dynamic user-account histories of multiple users, the one or more support documents may be identified.

Furthermore, the support-topic correlation model and/or the configuration/history model may include user preferences, which were provided by the user when registering for the online service or another online service offered by the service provider. Additionally, the support-topic correlation model and the configuration/history model may be combined into a single supervised-learning model.

Figure 2A:
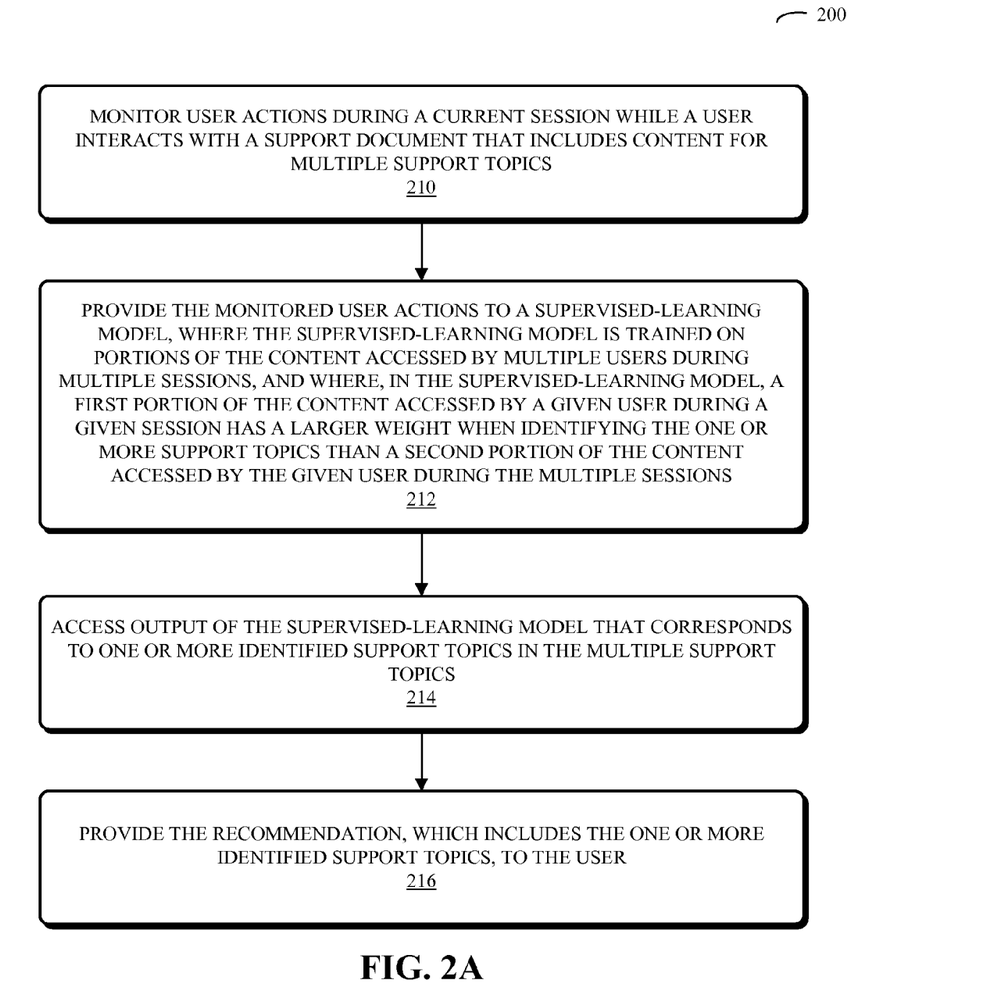
FIG. 2A is a flowchart illustrating an embodiment of a process for providing a recommendation.

FIG. 2A presents a flowchart illustrating a process 200 for providing a recommendation, which may be performed by a system. During operation, the system monitors user actions during a current session while a user interacts with a support document (such as support document 100 in FIG. 1) that includes content for multiple support topics (210). Next, the system provides the monitored user actions to a supervised-learning model (212). This supervised-learning model is trained on portions of the content accessed by multiple users during multiple sessions. Moreover, in the supervised-learning model, a first portion of the content accessed by a given user during a given session has a larger weight when identifying the one or more support topics than a second portion of the content accessed by the given user during the multiple sessions.

Then, the system accesses output of the supervised-learning model that corresponds to one or more identified support topics in the multiple support topics (214), and the system provides the recommendation, which include the one or more identified support topics, to the user (216). The recommendation may include a ranking of the one or more support topics based at least in part on estimated relevance of the one or more support topics to the user (for example, a likelihood that the one or more support topics are associated with the user's problem).

In some embodiments, the supervised-learning model optionally identifies the one or more support topics based at least in part on a user configuration of a product (such as an online advertising account), a dynamic user-account history and/or user preferences.

Figure 2B:
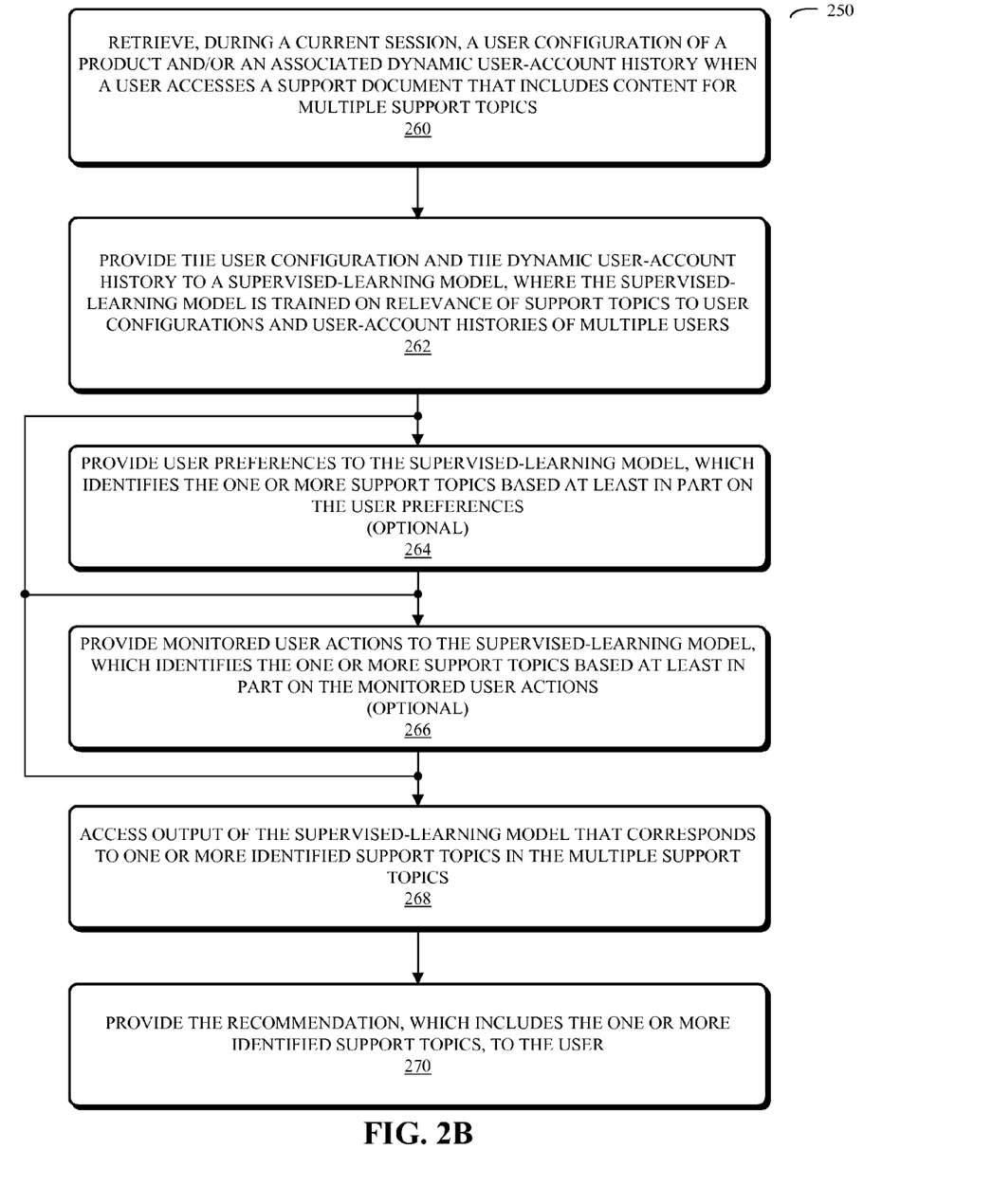
FIG. 2B is a flowchart illustrating an embodiment of a process for providing a recommendation.

FIG. 2B presents a flowchart illustrating a process 250 for providing a recommendation, which may be performed by a system. During operation, the system retrieves, during a current session, a user configuration of a product and/or an associated dynamic user-account history when a user accesses a support document (such as support document 100 in FIG. 1) that includes content for multiple support topics (260). Next, the system provides the user configuration and the dynamic user-account history to a supervised-learning model (262), where the supervised-learning model is trained on relevance of support topics to user configurations and user-account histories of multiple users. Then, the system accesses output of the supervised-learning model that corresponds to one or more identified support topics in the multiple support topics (268). Moreover, the system provides the recommendation, which include the one or more identified support topics, to the user (270).

In some embodiments, the system optionally provides user preferences to the supervised-learning model, which identifies the one or more support topics based at least in part on the user preferences (264). Moreover, the system may optionally provide monitored user actions to the supervised-learning model, which identifies the one or more support topics based at least in part on the monitored user actions (266).

Note that processes 200 (FIG. 2A) and 250 may include additional or fewer operations. Moreover, the order of the operations may be changed, and/or two or more operations may be combined into a single operation.

Figure 3:
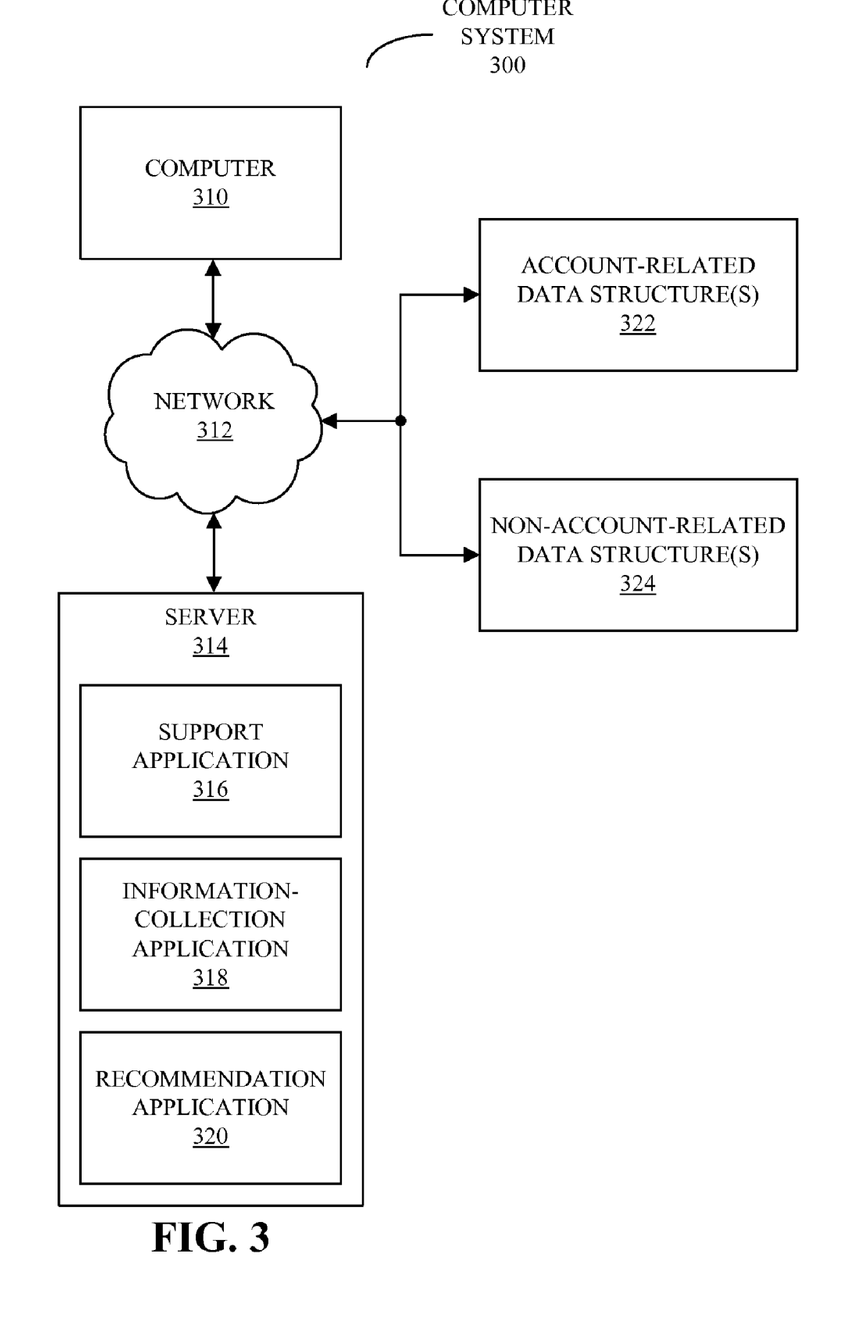
FIG. 3 is a block diagram illustrating an embodiment of a networked computer system that collects information and provides one or more recommendations.

We now describe embodiments of the computer system that may be used to provide one or more recommendations. FIG. 3 presents a block diagram illustrating a networked computer system 300 that collects information (for example, by monitoring user actions, or retrieving stored user configurations and/or dynamic user-account histories) and provides one or more recommendations.

In this computer system, the user may access the online account from computer 310 via network 312. For example, server 314 may provide instructions for a web page corresponding to the online account via network 312, which are rendered by a web browser on computer 310. This network may include: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices. Consequently, the 'online' account should be understood to include an account that is implemented on a network with limited or restricted access (such as an intranet) or a network that can be accessed by a general user (such as the Internet).

Additionally, the online service associated with the online account may be implemented using a software-application tool that is embedded in the web page. This software-application tool may be a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing:

JavaScript, ECMAScript instructions, VBScript instructions, or instructions in another programming language suitable for rendering by the web browser or another client application on the computer 310. Therefore, in some embodiments the user of the software-application tool may not have to download an application program onto computer 310 in order to use it.

As noted previously, if the user has a problem with the online account or the associated online service, the user may access a support document (such as support document 100 in FIG. 1). For example, the user may access a help-center web page or website. Instructions for this web page or website may be provided by support application 316 (which is resident on and executes on server 314) via network 312, and these instructions may be rendered by a web browser on computer 310.

As the user navigates through support topics in the support document (in an attempt to find content relevant to the user's problem), information-collection application 318 (which is resident on and executes on server 314) may monitor and store a record of the user actions in a data structure, such as one of non-account-related data structures 324. In conjunction with the support-topic correlation model, which determines relationships between support topics in the support document, recommendation application 320 (which is resident on and executes on server 314) may use the current or recent user actions (including user actions during the current session and/or during one or more previous sessions) to identify one or more support topics that are likely to be relevant to the user's problem, and may provide one or more recommendations that present the one or more identified support documents to the user. For example, server 314 may provide instructions for a recommendation via network 312, which are rendered by a web browser on computer 310. These instructions may include a ranking of the one or more identified support topics. Note that this recommendation technique may be performed without or prior to user identification (such as, before a user logs in to the online account) and/or without or prior to the user providing a search query related to the user's problem.

Recommendations may be provided to the user dynamically during the current session (i.e., while the user accesses the support document) as the user actions change or evolve. Moreover, the support-topic correlation model may be adapted during the current session of the user (for example, based at least in part on the user actions during the current session). Alternatively, the supervised-learning model may be predetermined (i.e., may be determined prior to the current session). For example, the support-topic correlation model may have been trained based at least in part on user actions of multiple users during multiple sessions (such as sessions over a month-long time period). In this supervised-learning model, support topics that are accessed by a given user during a given session are more likely to be semantically related to a common problem (and thus, may have larger weights in the model) than support topics accessed by the given user in multiple sessions. Moreover, in the support-topic correlation model, the degree of association (and thus, the weights) between two support topics accessed by the given user during the given session may be inversely proportional to the total number of support topics accessed by the given user during the given session, because the relevance to the given user's problem may decrease as the total number increases. By analyzing the browsing behavior of multiple users during the multiple sessions, as they navigate through the support topics in the support document, strong relationships or associations between groups of support topics can be determined. In the support-topic-correlation model, a given group of support topics is assumed to be related to a common problem (even though this common problem may remain unknown to the model).

In an exemplary embodiment, the support-topic correlation model determines support-topic relationships in the support document using a model of relationships generated using a weighted-cross-product collaborative filtering technique on support-topic visits, in which the weights represent the relative amount or degree of association between the support topics. However, a wide variety of supervised-learning techniques may be used, including: regression, classification and regression trees, support vector machines, linear models, nonlinear models, parametric models and/or non-parametric models. Moreover, the support-topic correlation model may be trained using user actions of hundreds to tens of millions of users.

Using the support-topic correlation model, recommendation application 320 can determine that a help-center visitor, who accessed support topic A, may find documents B, C and D helpful. For returning users, this capability can be extended using knowledge (via stored user actions) of support topics that were accessed during one or more previous sessions. However, support topics that were accessed a long time ago are more likely to be associated with an unrelated user problem (i.e., a different user problem). Consequently, a contribution of a given accessed support topic to the identification of the one or more support topics may have an inverse relationship to an elapsed time since the given support topic was accessed. For example, support topics may be independently identified using the support-topic correlation model for each of the last N support topics accessed by the user, and the identified support topics may be summed with weights that decrease exponentially as the elapsed time since the corresponding support topic was accessed. The resulting ranking may be presented to the user in a recommendation.

Alternatively or additionally to monitored user actions, information-collection application 318 may retrieve a user configuration of the online service and/or an associated dynamic user-account history, either of which may be stored in one of account-related data structures 322. For example, the online service may be an online advertising account, the user configuration may be an ongoing payment technique associated with the online advertising account, and the dynamic user-account history may include advertising activity (such as user clicks on advertising links and/or user purchases associated with such advertising) and financial information associated with the advertising activity (such as a current account balance for the advertising, which is determined based at least in part on the advertising activity). This stored information may be accessed based at least in part on an identifier associated with the user, such as a cookie associated with the user account which is stored on computer 310, which is identified by information-collection application 318 when the user accesses the support document.

Using the retrieved user configuration and/or the associated dynamic user-account history, recommendation application 320 may identify one or more support topics that are likely to be relevant to the user's problem using the configuration/history model, which determines relationships between the user configurations and/or user-account histories of multiple users. For example, if the ongoing payment technique includes direct billing, the one or more identified support topics may include instructions for troubleshooting direct billing. Alternatively, if the ongoing payment technique includes credit-card billing, the one or more identified support topics may include instructions for troubleshooting credit-card billing.

Moreover, recommendation application 320 may provide instructions for a recommendation via network 312, which are rendered by a web browser on computer 310. These instructions may include a ranking of the one or more identified support topics. As with the recommendations that are determined based at least in part on user actions, these recommendations may be provided to the user dynamically during the current session (i.e., while the user accesses the support document) as the dynamic user-account history changes or evolves. Additionally, these embodiments of the recommendation technique may be performed without or prior to user identification (such as, before a user logs in to the online account) and/or without or prior to the user providing a search query related to the user's problem. In these embodiments, however, the user is not anonymous. Instead, knowledge about the user (in the form of the user configuration and/or the dynamic user-account history) may be used.

In an exemplary embodiment, the configuration/history model includes logistic regression. However, a wide variety of supervised-learning techniques may be used, including: regression, classification and regression trees, support vector machines, linear models, nonlinear models, parametric models and/or non-parametric models. This configuration/history model may be adapted during the current session of the user (for example, based at least in part on the user-account history during the current session). Alternatively, the configuration/history model may be predetermined (i.e., may be determined prior to the current session), for example, based at least in part on the user configurations and/or user-account histories of hundreds to tens of millions of users. As noted previously, in some embodiments the support-topic correlation model and the configuration/history model are combined into a combined model. This combined model may identify one or more support documents based at least in part on one or more inputs, including: the monitored user actions, the user configuration, the dynamic user-account history, and/or user preferences (such as a type of operating system used by the user or subjects that are of interest to the user).

In order to train the supervised-learning models and/or to identify the one or more support topics, information in account-related data structures 322 and/or non-account-related data structures 324 may be converted into another format. In particular, one or more relational databases may be flattened into feature-value pairs that are suitable for use in statistical-learning techniques. For example, user configurations for the online service often are stored in a relational database, which typically cannot be used 'as is' for training a supervised-learning model. This challenge may be overcome by flattening user data in a relational database, and transforming it into a set of feature-value pairs that describe user data.

In this re-formatting process, all of the data associated with the user, which may be hierarchically organized in a relational database in multiple levels of 'parent' and 'child' tables, may be aggregated. During this process, the data from the 'child' tables on each of the levels of the hierarchy may be rolled up, and the aggregate results may be associated with the user. For example, the user may be associated with multiple online accounts. These online accounts may be associated with multiple advertising campaigns, each of which has multiple advertising keywords. Moreover, there may be multiple bids or price points associated with each advertising keyword. During the re-formatting process, information-collection application 318 may calculate the sum, the average, the maximum, the minimum, and/or the distribution of the bids for each advertising keyword. Then, information-collection application 318 may move up in the hierarchy, and may calculate the same statistics at the advertising-campaign level, as it pertains to each online account, and may finally summarize the online accounts at the user level. As a result, information-collection application 318 may obtain a set of feature-value pairs, all of which are associated with the user.

Note that this technique for summarizing relational-database information may be lossy, because information about intermediate relationships between entities may be lost. However, the re-formatting process may still capture the essence or important information in the user configuration and/or user-account history, which is detailed enough to uniquely describe the user's problem (e.g., which can be used with one of the supervised-learning models to identify the one or more support topics).

When aggregating data from multiple users to train a supervised-learning model, the feature-value pairs may be compared to thresholds to establish a limited set of discrete categories for each of the specific user features. This may configure the data for use in training a supervised-learning model, and may allow a group of closely related values to be assigned to one of the discrete categories to facilitate determination of general trends in the data.

In some embodiments, the monitored user actions are stored in log files, which are parsed to retrieve training data to train a supervised-learning model.

Figure 4:
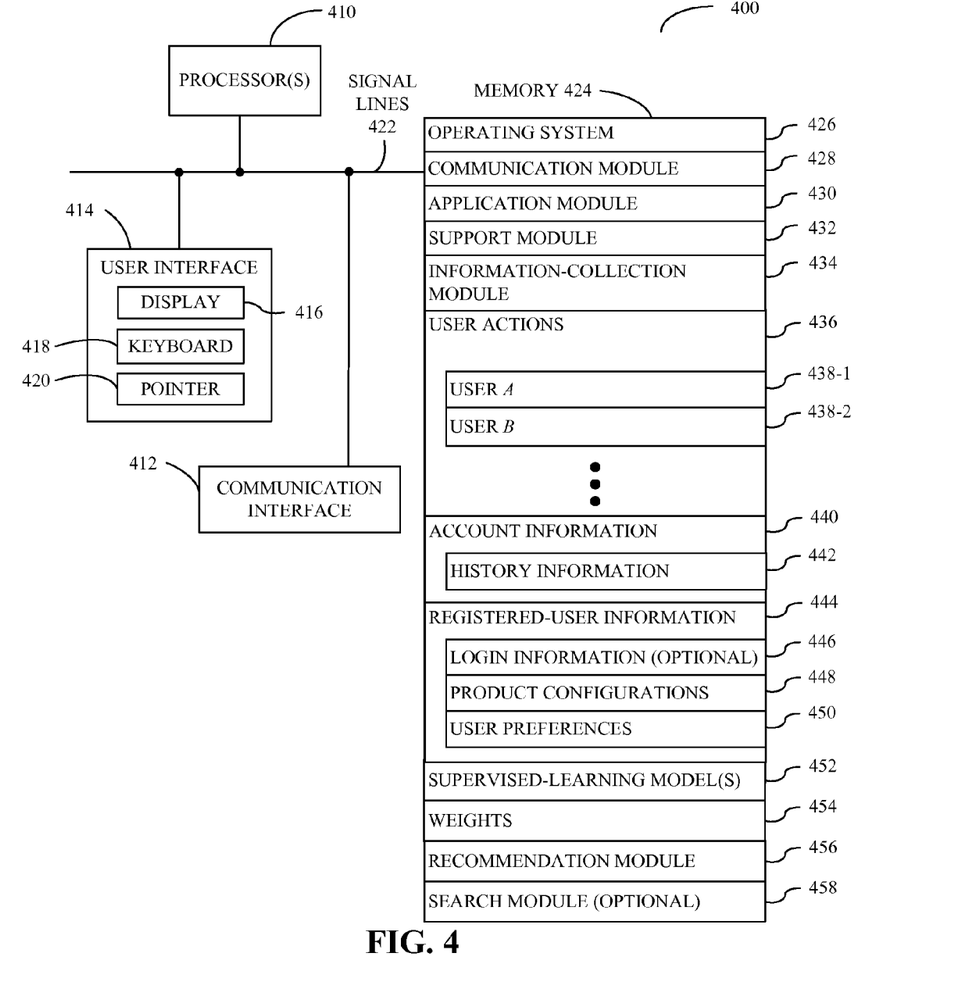
FIG. 4 is a block diagram illustrating an embodiment of a computer system that provides one or more recommendations.

We now describe the computer system in more detail. FIG. 4 presents a block diagram illustrating a computer system 400 that provides one or more recommendations. Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. While not shown in FIG. 4, the operating system 426 may include a web browser (or set of instructions) for providing and/or rendering information in web pages. Memory 424 may also store communications procedures (or a set of instructions) in a communication module 428. These communication procedures may be used for communicating with: one or more computers, devices and/or servers, including computers, devices and/or servers that are remotely located with respect to the computer system 400.

Memory 424 may also include one or more program modules (or a set of instructions), including: application module 430 (or a set of instructions), support module 432 (or a set of instructions), information-collection module 434 (or a set of instructions), recommendation module 456 (or a set of instructions), and/or optional search module 458 (or a set of instructions).

A user may utilize an online service provided using application module 430. When the user encounters a problem, the user may access a support document associated with the online service, which is provided by support module 432. During a current session and/or one or more previous sessions, in which the user interacts with the support document, information-collection module 434 may monitor and store user actions 436, such as user actions for user A 438-1 and user B 438-2. Alternatively or additionally, information-collection module 434 may access stored information associated with the online service, such as: registered-user information 444 and/or account information 440. For example, information-collection module 434 may access one of the user's product configurations 448 and/or history information 442 (such as a dynamic user-account history).

Previously or concurrently, recommendation model 456 may use stored user actions 436 and/or stored information for multiple users (which may or may not include the user) to train one or more supervised-learning models 452, such as: the support-topic correlation model, the configuration/history model and/or the combined model. Each of these models may have associated weights 454 that indicate a degree of association between inputs and outputs. In some embodiments, one or more of the supervised-learning models 452 may include user preferences 450.

Using the stored user actions 436 and/or the accessed information for the user (which may include user preferences 450 for the user), recommendation model 456 may identify one or more support topics in the support document that are likely to be relevant to the user's problem. Moreover, recommendation model 456 may provide information about these support topics to the user using communication module 428. For example, recommendation model 456 may provide rankings of the one or more identified support topics, as well as associated links, to the user.

Note that the one or more support topics may be identified without the user first providing optional login information 446 and/or without first providing a search query (associated with the user's problem) to optional search module 458. However, in other embodiments the one or more support topics are identified, at least in part, based at least in part on optional login information 446 provided by the user and/or one or more search queries provided by the user to optional search module 458.

Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processing units 410.

Although the computer system 400 is illustrated as having a number of discrete components, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions.

In some embodiments, some or all of the functionality of the computer system 400 may be implemented in one or more application-specific integrated circuits (ASICs) and/or one or more digital signal processors (DSPs). Moreover, the functionality of computer system 400 may be implemented more in hardware and less in software, or less in hardware and more in software, as is known in the art.

Figure 5:
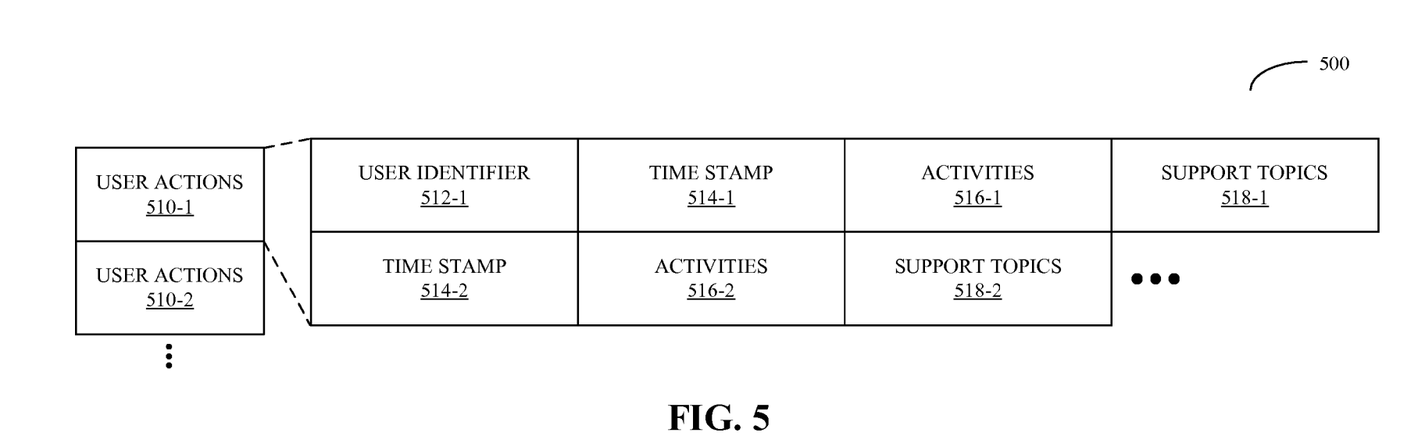
FIG. 5 is a block diagram illustrating an embodiment of a data structure.

We now describe embodiments of a data structure that may be used in computer system 300 (FIG. 3) and 400. FIG. 5 presents a block diagram illustrating a data structure 500. This data structure may include user actions 510. For example, user actions 510-1 may include a user identifier 512-1 (such as a cookie identifier associated with the user's computer or the user's online account) and multiple instances of time stamps 514 when one or more user activities 516 occurred and/or when support topics 518 were accessed.

Figure 6:
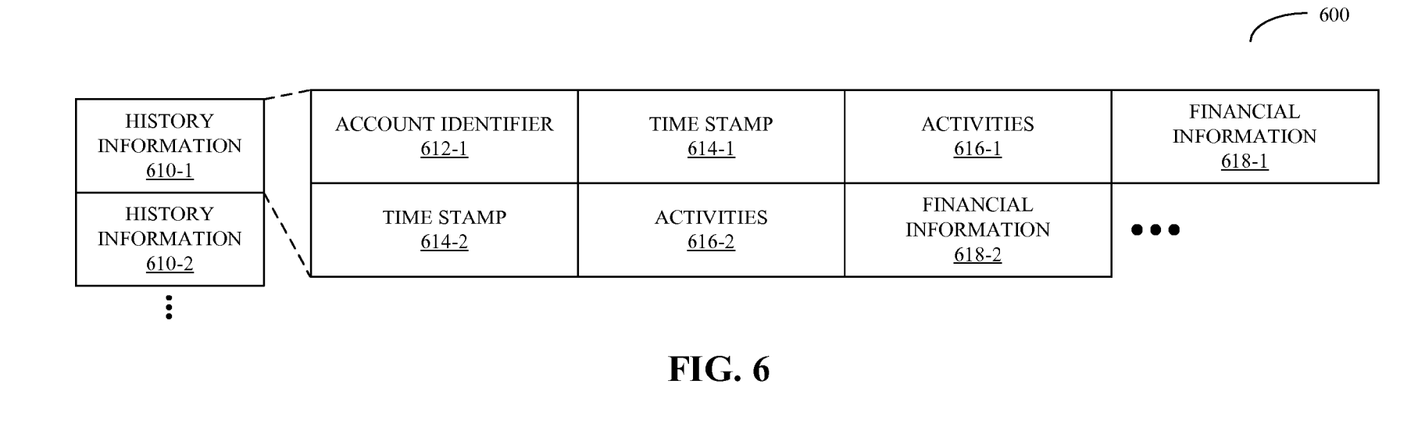
FIG. 6 is a block diagram illustrating an embodiment of a data structure.

FIG. 6 presents a block diagram illustrating a data structure 600. This data structure may include history information 610. For example, history information 610-1 may include account identifier 612-1 (such as the cookie) and multiple instances of time stamps 614 when one or more activities 616 associated with the online account (such as advertising activity) occurred and/or associated financial information 618 (such as an account balance associated with an advertising campaign) changed.

Computer system 300 (FIG. 3), computer system 400 (FIG. 4), data structure 500 and/or data structure 600 may include additional or fewer components. Moreover, two or more components may be combined into a single component, and/or a position of one or more components may be changed.

While the preceding embodiments illustrate the providing of one or more recommendations associated with a support document (such as a help-center document), in other embodiments the recommendation technique may be used in conjunction with a wide variety of documents that are associated with different applications, including arbitrary content on a web page or web site.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A method for providing a recommendation, comprising:
training a supervised-learning model based on portions of content in a support document that are accessed by one or more users during multiple separate sessions, wherein the support document comprises content for multiple support topics;
configuring the supervised-learning model so that when the supervised-learning model is used to identify one or more support topics, the supervised-learning model assigns a larger weight to a first portion of the content that is accessed by a given user during a single session than a second portion of the content that is accessed by the given user during multiple separate sessions;
monitoring user actions while a user interacts with the support document using a computer during a current session;
based on the user actions, using the supervised-learning model to identify one or more support topics in the multiple support topics; and
providing the recommendation, which includes the one or more identified support topics, to the user.

2. The method of claim 1, wherein the supervised-learning model is predetermined.

3. The method of claim 1, wherein the multiple sessions precede the current session.

4. The method of claim 1, wherein the content includes help instructions associated with an application or a service.

5. The method of claim 1, wherein the support document includes a website or a web page.

6. The method of claim 1, wherein the recommendation is provided dynamically during the current session.

7. The method of claim 1, wherein, for the given user, the weight in the supervised-learning model of the first portion of the content accessed during the given session corresponds inversely to a number of support topics in the first portion of the content.

8. The method of claim 1, wherein there is at least partial overlap of the first portion of the content and the second portion of the content.

9. The method of claim 1, wherein the first portion of the content is different than the second portion of the content.

10. The method of claim 1, wherein the recommendation is provided without the user providing login information.

11. The method of claim 1, wherein the recommendation is provided without the user providing a support query.

12. The method of claim 1, wherein the one or more support topics are identified based at least in part on a user configuration of a product.

13. The method of claim 1, wherein the one or more support topics are identified based at least in part on user preferences.

14. The method of claim 1, wherein the user actions include support topics accessed in a time interval during one or more sessions, which can include the current session; and
wherein a given weight of a given accessed support topic when identifying the one or more support topics corresponds inversely to an elapsed time since the given support topic was accessed.

15. The method of claim 1, wherein the recommendation includes a ranking of the one or more support topics based at least in part on estimated relevance of the one or more support topics to the user.

16. A computer-program product for use in conjunction with a computer system, the computer-program product comprising a computer-readable storage medium and a computer-program mechanism embedded therein for configuring the computer system to provide a recommendation, the computer-program mechanism including:
instructions for training a supervised-learning model based on portions of content in a support document that are accessed by one or more users during multiple separate sessions, wherein the support document comprises content for multiple support topics;
instructions for configuring the supervised-learning model so that when the supervised-learning model is used to identify one or more support topics, the supervised-learning model assigns a larger weight to a first portion of the content that is accessed by a given user during a single session than a second portion of the content that is accessed by the given user during multiple separate sessions;
instructions for monitoring user actions while a user interacts with the support document using a computer during a current session;
instructions for using the supervised-learning model to identify one or more support topics in the multiple support topics based on the user actions; and
instructions for providing the recommendation, which includes the one or more identified support topics, to the user.

17. The computer-program product of claim 16, wherein the content includes help instructions associated with an application or a service.

18. The computer-program product of claim 16, wherein, for the given user, the weight in the supervised-learning model of the first portion of the content accessed during the given session corresponds inversely to a number of support topics in the first portion of the content.

19. The computer-program product of claim 16, wherein the recommendation is provided without the user providing login information.

20. The computer-program product of claim 16, wherein the recommendation is provided without the user providing a support query.

21. A computer system, comprising:
means for computing;
memory; and
a program module, wherein the program module is stored in the memory and configured to be executed by the means for computing, the program module including:
instructions for training a supervised-learning model based on portions of content in a support document that are accessed by one or more users during multiple separate sessions, wherein the support document comprises content for multiple support topics,
instructions for configuring the supervised-learning model so that when the supervised-learning model is used to identify one or more support topics, the supervised-learning model assigns a larger weight to a first portion of the content that is accessed by a given user during a single session than a second portion of the content that is accessed by the given user during multiple separate sessions,
instructions for monitoring user actions while a user interacts with the support document using a computer during a current session instructions for using the supervised-learning model to identify one or more support topics in the multiple support topics based on the user actions, and
instructions for providing the recommendation, which includes the one or more identified support topics, to the user.

22. A computer system, comprising:
a processor;
memory; and
a program module, wherein the program module is stored in the memory and configured to be executed by the processor, the program module including:
instructions for training a supervised-learning model based on portions of content in a support document that are accessed by one or more users during multiple separate sessions, wherein the support document comprises content for multiple support topics,
instructions for configuring the supervised-learning model so that when the supervised-learning model is used to identify one or more support topics, the supervised-learning model assigns a larger weight to a first portion of the content that is accessed by a given user during a single session than a second portion of the content that is accessed by the given user during multiple separate sessions,
instructions for monitoring user actions while a user interacts with the support document using a computer during a current session,
instructions for using the supervised-learning model to identify one or more support topics in the multiple support topics based on the user actions, and
instructions for providing the recommendation, which includes the one or more identified support topics, to the user.

* * * * *